United States Patent
Cockcroft

(10) Patent No.: US 9,552,608 B2
(45) Date of Patent: Jan. 24, 2017

(54) MANAGING DUPLICATION OF CONTENT ITEMS ACROSS MULTIPLE CONTENT ITEM LISTS

(71) Applicant: PayPal, Inc., San Jose, CA (US)

(72) Inventor: Oliver Nicholas Cockcroft, Los Gatos, CA (US)

(73) Assignee: PAYPAL, INC., San Jose, CA (US)

( * ) Notice: Subject to any disclaimer, the term of this patent is extended or adjusted under 35 U.S.C. 154(b) by 84 days.

(21) Appl. No.: 14/192,608

(22) Filed: Feb. 27, 2014

(65) Prior Publication Data

US 2015/0242940 A1    Aug. 27, 2015

(51) Int. Cl.
   *G06F 3/048* (2013.01)
   *G06Q 30/06* (2012.01)
   *G06Q 30/08* (2012.01)
   *G06F 3/0481* (2013.01)

(52) U.S. Cl.
   CPC .......... *G06Q 30/0643* (2013.01); *G06Q 30/08* (2013.01); *G06F 3/0481* (2013.01)

(58) Field of Classification Search
   CPC   G06F 17/30867; G06F 3/0481; G06F 3/0482; G06Q 30/0621; G06Q 30/0631; G06Q 30/0643

USPC .................................. 715/764, 825; 707/706
   See application file for complete search history.

(56) References Cited

U.S. PATENT DOCUMENTS 8,250,012 B1*  8/2012  Whitman ............... G06Q 30/02
                                                      706/45
   9,058,392 B1*  6/2015  Pennock ........... G06F 17/30864
   2009/0019030 A1* 1/2009  Smolyanskiy .... G06F 17/30864
   2011/0014351 A1* 1/2011  Reider ................ G06F 19/3475
                                                      426/648
   2015/0169557 A1* 6/2015  Ciordas ............ H04N 21/44222
                                                      707/609

* cited by examiner

Primary Examiner — Haoshian Shih
   (74) Attorney, Agent, or Firm — Maschoff Brennan

(57) ABSTRACT

A method of reducing duplications of content items across multiple content item lists presented to a user is disclosed. A first set of content items is received. It is detected that the first set of content items was communicated for presentation to a user in a first list. A second set of content items is received. It is determined that the second set of content items includes a duplicate content item, the duplicate content item being a content item that was included in the first set of content items. Based on a satisfaction of an omission criterion, an indication is provided that the content item is to be omitted from the second set of content items before the second set of content items is communicated for presentation to the user in a second list.

20 Claims, 11 Drawing Sheets

FIG. 8

MANAGING DUPLICATION OF CONTENT ITEMS ACROSS MULTIPLE CONTENT ITEM LISTS

TECHNICAL FIELD

The present application relates generally to the technical field of internet commerce, and, in one specific example, to a method of reducing duplications of content items in multiple listings of items that are presented to a user in a user interface associated with a network-based publication system.

BACKGROUND

Various network-based publication systems (e.g., EBAY®, AMAZON®, or CRAIGSLIST®) may facilitate buying or selling of items (e.g., goods or services) by their users. In some cases, users may be presented with various lists of items. For example, a user may be presented with lists of items that are recommended for the user (e.g., based on other items that the user has purchased and the purchasing behavior of other users of the system who have purchased those other items). Or the user may be presented with lists of items that match particular keyword that the user has performed and saved for future use. Or the user may be presented with lists of items through targeted advertising managed by the network-based publication system.

BRIEF DESCRIPTION OF THE DRAWINGS

Some embodiments are illustrated by way of example and not limitation in the figures of the accompanying drawings.

FIG. 8 is a line drawing illustrating an example user interface in which a first list of content items is displayed in a first region of the user interface and a second list of content items is displayed in a second region of the user interface.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

A method of reducing duplications of content items across multiple content item lists presented to a user is disclosed. A first set of content items is received. It is detected that the first set of content items was communicated for presentation to a user in a first list. A second set of content items is received. It is determined that the second set of content items includes a duplicate content item, the duplicate content item being a content item that was included in the first set of content items. Based on a satisfaction of an omission criterion, an indication is provided that the content item is to be omitted from the second set of content items before the second set of content items is communicated for presentation to the user in a second list.

This method and various embodiments disclosed herein may be implemented as a computer system having one or more modules (e.g., hardware modules or software modules). This method and various embodiments disclosed herein may be embodied as instructions stored on a machine-readable medium that, when executed by a processor, cause the processor to perform the method.

Figure 1:
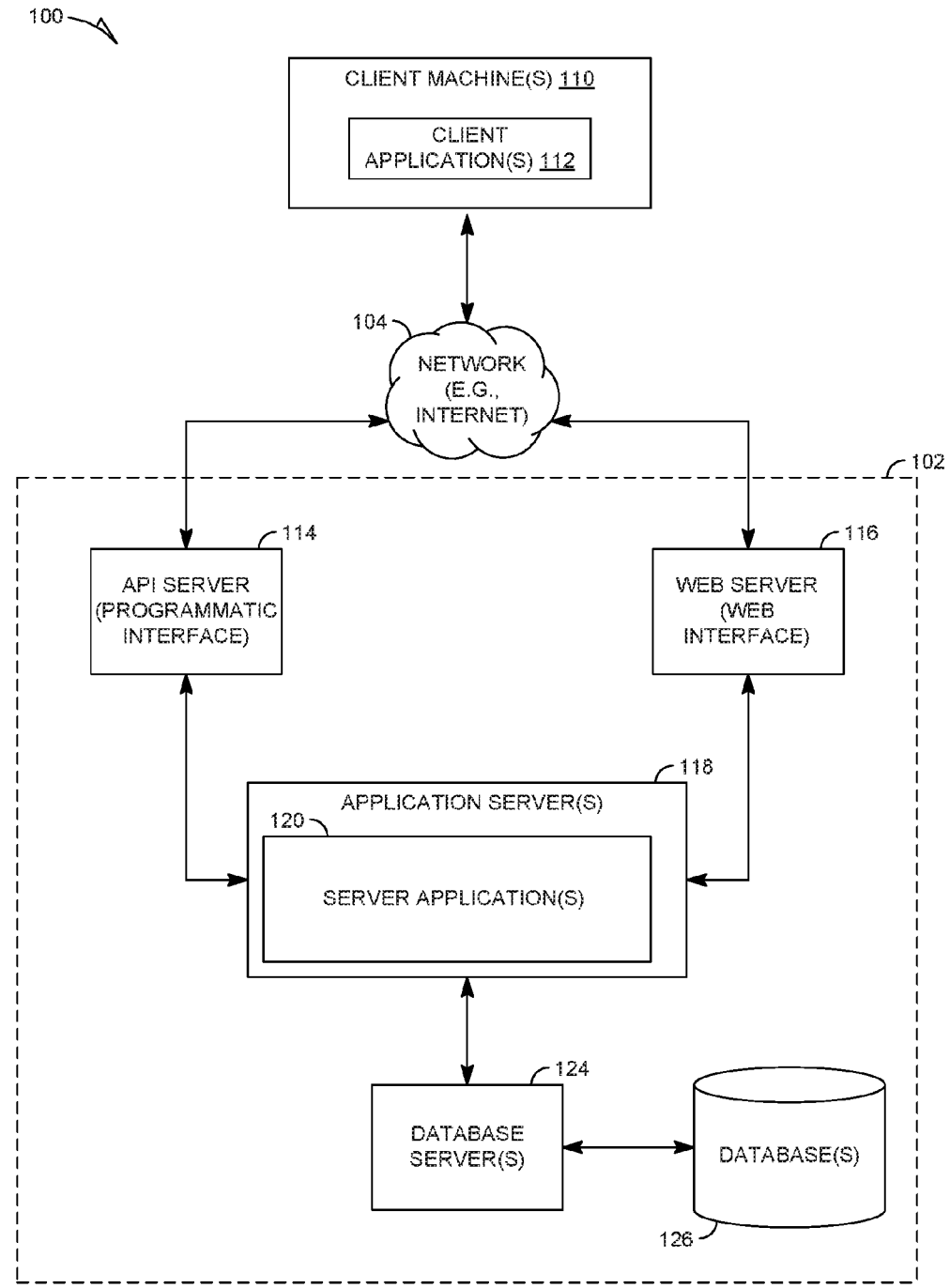
FIG. 1 is a network diagram depicting a client-server system within which various example embodiments may be deployed.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients machines 110. FIG. 1 illustrates client application(s) 112 on the client machines 110. Examples of client application(s) 112 may include a web browser application, such as the Internet Explorer browser developed by Microsoft Corporation of Redmond, Wash. or other application supported by an operating system of the device, such as Windows, iOS or Android operating systems. Each of the client application(s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more server application(s) 120. The application servers 118 are, in turn, shown to be coupled to one or more database servers 124 that facilitate access to one or more databases 126 or data stores, such as NoSQL or non-relational data stores.

The applications 120 may provide a number of marketplace functions and services to users that access the networked system 102. While the applications 120 are shown in FIG. 1 to form part of the networked system 102, in alternative embodiments, the various applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various server applications 120 could also be implemented as standalone software programs, which do not necessarily have networking capabilities. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors (e.g., Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. An example of one of the client application(s) 112 may be a seller application (e.g., the TurboLister application developed by eBay Inc., of San Jose, Calif.) that enables sellers to author and manage listings on the networked system 102 in an off-line manner, and to perform batch-mode communications between the client application(s) 112 and the networked system 102. Other examples of client application(s) 112 may be third-party applications. For example, the third-party applications may, utilizing information retrieved from the networked system 102, support one or more features or functions on a website hosted by the third party. The third-party website may, for example, provide one or more promotional, marketplace or payment functions that are supported by the relevant applications of the networked system 102.

Figure 2:
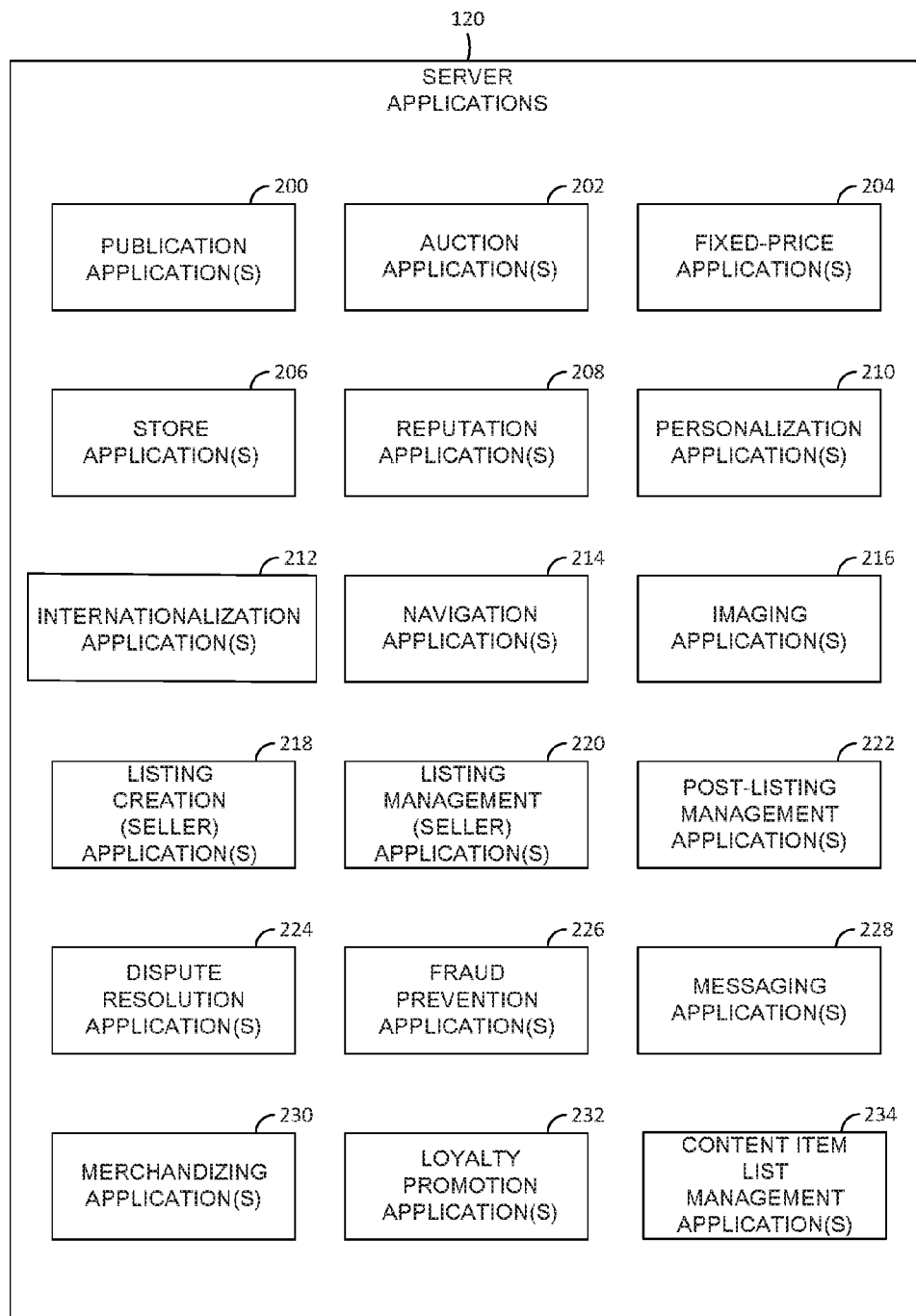
FIG. 2 is a block diagram illustrating multiple applications including best offer applications that, in various example embodiments, are provided as part of the networked system of FIG. 1.

FIG. 2 is a block diagram illustrating multiple server applications 120 that, in various example embodiments, are provided as part of the networked system 102. The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 so as to allow the server applications 120 to share and access common data. The server applications 120 may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the server applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. For instance, a version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications.

In order to make listings available via the networked system 102 as visually informing and attractive as possible, the marketplace applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. The listing creation application 218 and listing management applications 220 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular seller, and may be offered a reward for which accumulated loyalty points can be redeemed.

Content item list management application(s) 234, described in more detail below, may reduce a number of duplications of content items across multiple lists of content items (e.g., references to listings of items on the network-based publication system) that are presented to the user in user interfaces associated with the network-based publication system.

Figure 3A:
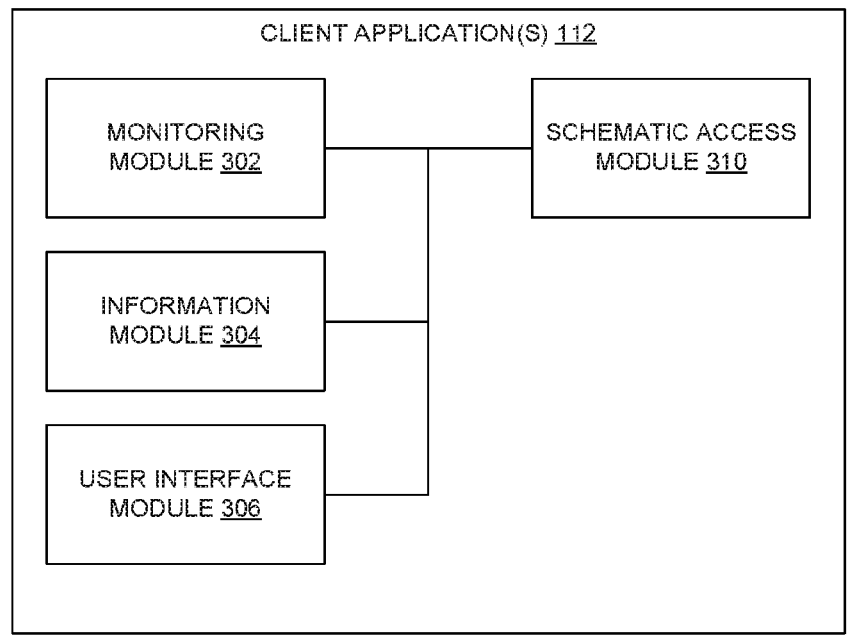
FIG. 3A is a block diagram illustrating example modules of the client application(s) of FIG. 1.

FIG. 3A is a block diagram illustrating example modules of the client application(s) 112. A monitoring module 302 may be configured to monitor online activities of a user with respect to items that may be listed on a network-based publication system. An information module 304 may be configured to collect information from which the item may be identified, such as an image of the item, a barcode corresponding to the item, a product identifier corresponding to the item, and so on. A user interface module 306 may be configured to present a user interface to the user for collecting information about the item, providing the user with an option to access schematics pertaining the item, providing the user with the option to project a likeness of the item onto a surface, or providing the user with the ability to calibrate the projection of the item. A schematic access module 310 may access schematics corresponding to an item. For example, the schematic access module 310 may access schematics from storage on the device or the schematic access module 310 may download the schematics (e.g., based on communication with a schematic collection module 354) as is described in more detail below.

In various embodiments, various functions of the client application(s) 112 may be provided by the item projection application(s) 234 of the server application(s) 120 instead of, in addition to, or in combination with the client application(s) 112. For example, item-projection functions may be distributed between the client and server applications.

Figure 3B:
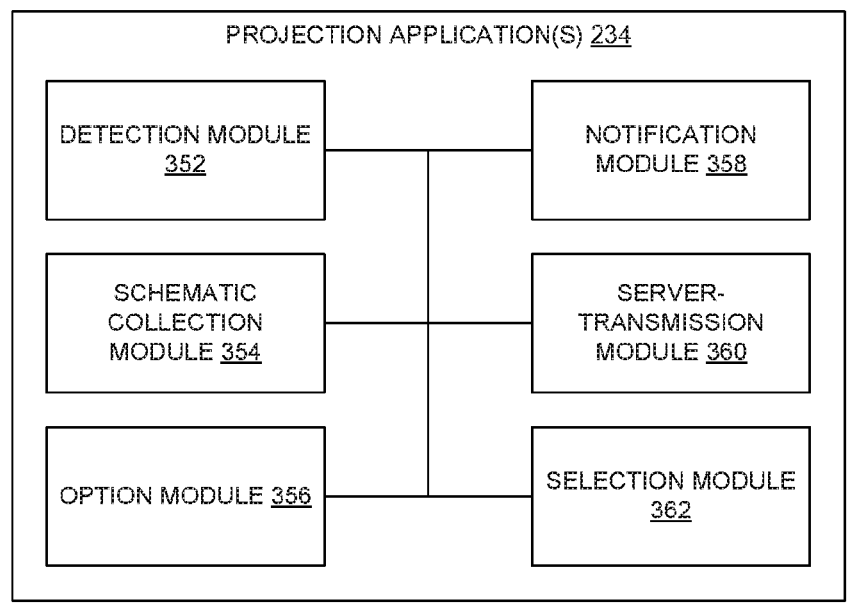
FIG. 3B is a block diagram illustrating example modules of the item projection application(s) of FIG. 2.

FIG. 3B is a block diagram illustrating example modules of the item projection application(s) 234. A detection module 352 may be configured to detect that a user is interested in an item. For example, the detection module 352 may determine that a user has performed actions on a client device with respect to an item (e.g., based on a communication received from the monitoring module 302). Alternatively, the detection module 352 may determine that a user has performed actions with respect to the network-based publication system that pertain to the item. For example, the detection module 352 may detect that a user has browsed the item, made a posting pertaining to the item, watched listings of the item, placed a bid on the item, and so on.

The schematic collection module 354 may be configured to collect schematics corresponding to items that may be listed on the network-based publication system. For example, the schematic collection module 354 may receive schematics from buyers or sellers of the items or through crowd sourcing.

An option module 356 may be configured to provide a user who browses a listing of an item with an option to project a likeness of the item onto a surface. This option may be presented to the user via a user interface element (e.g., a "Project" button) that is provided in a listing page corresponding to the item. Alternatively, this option may be presented to the user interface via a user interface presented to the user via the user interface module 306.

Figure 4:
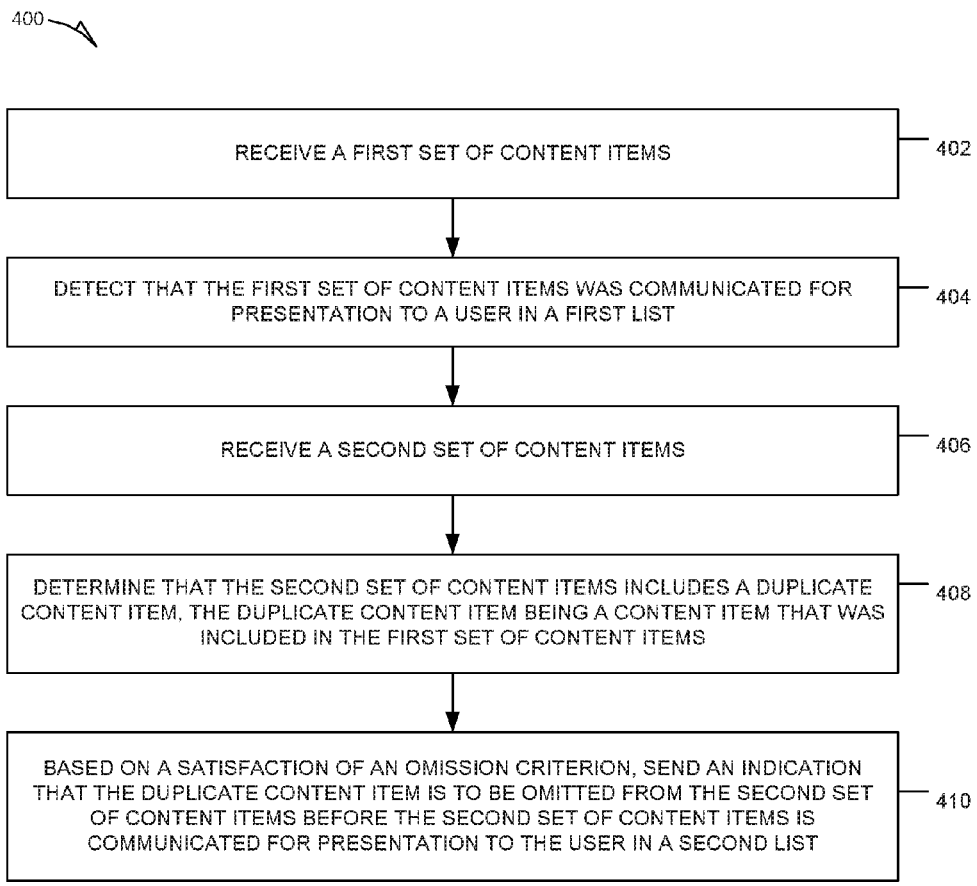
FIG. 4 is a flowchart illustrating example operations of a method of reducing a number of duplications of content items across multiple lists of content items that are presented to a user.

FIG. 4 is a flowchart illustrating example operations of a method 400 of reducing a number of duplications of content items across multiple lists of content items that are presented to a user. In various embodiments, the method 400 may be performed by various modules of the content item list management application(s) 234.

At operation 402, the server-reception module 352 receives a first set of content items (or a set of references to the set of content items). For example, the reception module 352 may receive a set of content items corresponding to listings of items (e.g., items for sale) on the network-based publication system. Such content items may correspond to search result items in a search results listing that is to be presented to the user. For example, the content items may be links to web pages that include information pertaining to the listings of the items. Alternatively, the listings of items may correspond to items that have been recommended to the user (e.g., based on other items that the user has purchased and the purchasing behavior of other users of the system who have purchased those other items), listings of items that match keywords corresponding to searches that the user has saved, listings of items included in advertisements that are to be presented to the user, and so on.

At operation 404, the detection module 354 detects that the first set of content items was communicated for presentation to a user in a first list. For example, the detection module 354 may determine that one of the server applications 120 sent the first set of content items to the client application(s) 112 for presentation in user interfaces on a device of the user.

At operation 406, the server-reception module 352 receives a second set of content items (or a set of references to the set of content items). In various embodiments, the second set of content items corresponds to an additional listing of items on the network-based publication system. Just as with the first set of content items, the second set of content items may correspond to search result items, items recommended to the user, listings of items that match keywords corresponding to searches that the user has saved, listings of items included in advertisements that are to be presented to the user, and so on.

At operation 408, the identification module 356 identifies that the second set of content items includes a duplicate content item. Here, the duplicate content item may be a content item that was included in the first set of content items that was previously communicated for presentation to the user.

At operation 410, the notification module 358 provides an indication that the content item that the duplicate content item is to be omitted from the second set of content items before the second set of content items is to be communicated for presentation to the user in a second list.

Thus, in various embodiments, the various server applications 120 may use functionalities provided by the content item list management application(s) 234 to filter sets of content items before sending the sets of content items to the client application(s) 112 for presentation in user interfaces on the devices of the user. For example, each time a server application is about to send a set of content items to the client application(s) 112, the server application may first send a set of references to the set of content items to the content item list management application(s) 234. If the content item list management application(s) 234 indicate that the set of content items includes one or more duplicate items that, based on one or more omission criteria, are to be omitted from the set of content items that is to be sent, the server application may then omit duplicate content items from the list of content items before sending the list of content items to the client application(s) 112.

Furthermore, the server application may keep track of duplicate content items that are filtered from sets of content items that are communicated to the client application(s) 112 such that the server application may provide one or more of the duplicate content items to the server application(s) 112 at a later date (e.g., upon receiving of a request for the one or more duplicate content items from the client application (s) 112).

In various embodiments, omission criteria may pertain to, for example, whether the first list and the second list are to be presented to the user simultaneously in one or more user interfaces, a time period between when the first list was presented to the user and when the second list is to be presented to the user, a frequency of an activity of the user with respect to the first list and a frequency of an activity of the user with respect to the second list, whether the user has expressed interest in the duplicate content item, and so on.

For example, an omission criterion may specify that, if a second set of content items is to be presented to a user simultaneously with a first set of content items, duplicate items are to be removed from the second set of content items before the second set of content items is communicated. As another example, an omission criterion may specify that if a frequency with which a user accesses a second list corresponding to a second set of content items transgresses an access-frequency threshold, then duplicate items are to be removed from the second set of content items before the second set of content items is communicated. As another example, an omission criterion may specify that if a time period between when a user accessed a first list and when the user will access the second list does not transgress a time threshold, then duplicate items are to be removed from the second set of content items before the second set of content items is communicated. As another example, an omission criterion may specify that if a user has not expressed interest in the duplicate content items (e.g., based on a monitoring of the behavior of the user with respect to a previous presentation of the duplicate content items to the user), that the duplicate content items are to be removed from the second set of content items before the second set of content items is communicated.

Figure 5:
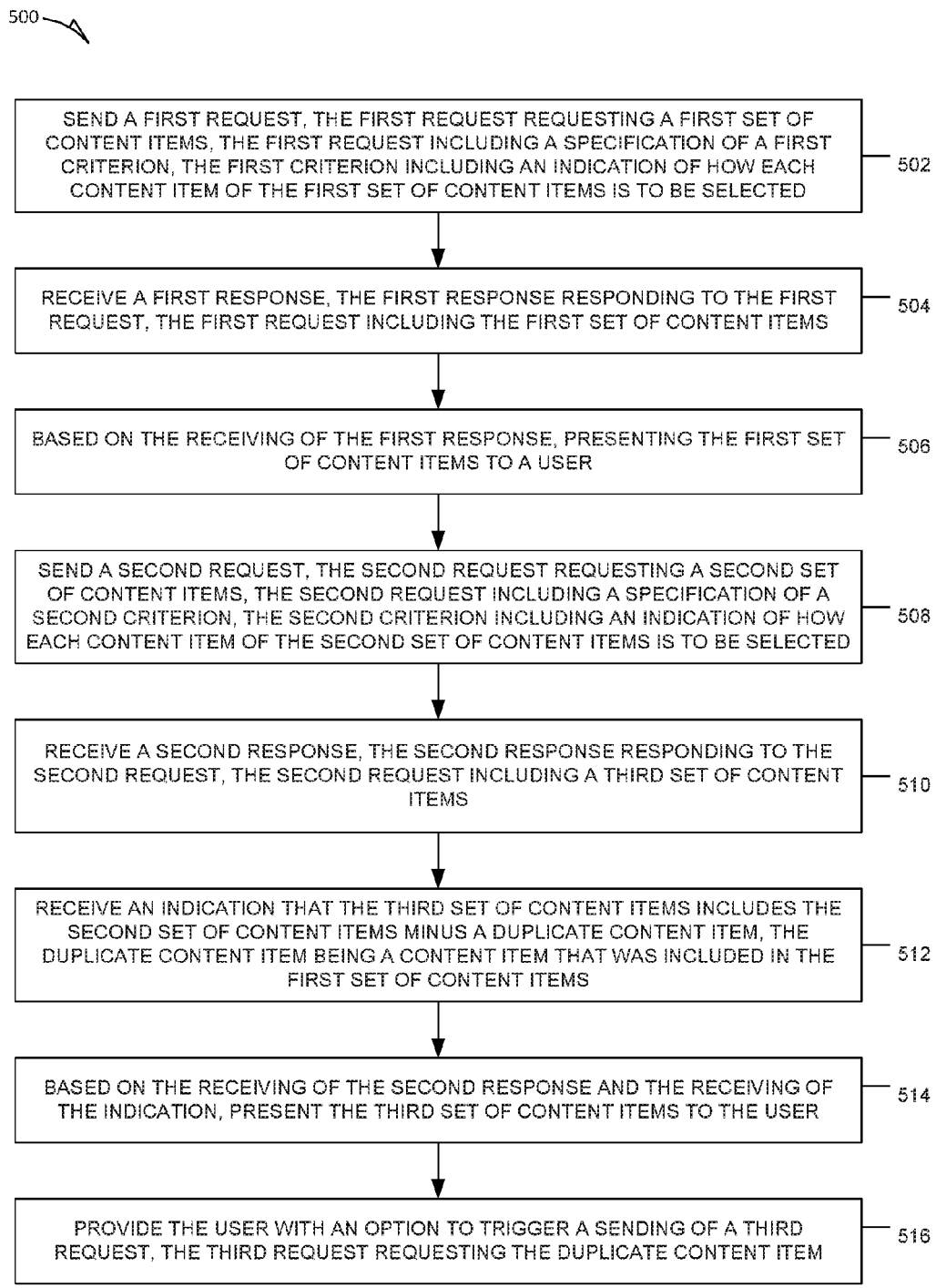
FIG. 5 is a flowchart illustrating example operations of a method of reducing a number of duplications of content items across multiple lists of content items that are presented to a user.

FIG. 5 is a flowchart illustrating example operations of a method 500 of reducing a number of duplications of content items across multiple lists of content items that are presented to a user. In various embodiments, the method 500 may be performed by various modules of the client application(s) 112.

At operation 502, the monitoring module 302 sends a first request. The first request may request a first set of content items. Additionally, the first request may include a specification of a first criterion. The first criterion may include an indication of how each content item of the first set of content items is to be selected. For example, the first criterion may specify that each of the first set of content items is to be an item that is recommended to the user by the network-based publication system (e.g., based on other items that the user has purchased and the Purchasing behavior of other users of the system who have purchased those other items), that each of the first set of content items is to match a keyword search saved by the user, and so on. In various embodiments, the sending of the request may be triggered by an action of the user within a user interface presented to the user on a device of the user, such as a clicking of a link to view a list of items corresponding to keywords saved by the user or a clicking of a link to view a list of items that are recommended for the user.

At operation 504, in response to the first request, the information module 304 receives a first response. The first response may include a first set of content items that were selected based on the first criterion.

At operation 506, based on the receiving of the first response, the user interface module 306 presents the first set of content items to a user. For example, the user interface module 306 displays links corresponding to the first set of content items in a user interface of the client application(s) 112. The user may then select the links from within the user interface to access more information corresponding to the content items, such as a listing of an item on the network-based publication system.

At operation 508, the monitoring module 302 sends a second request. The second request may request a second set of content items. Additionally, the second request may include a specification of a second criterion. The second criterion may include an indication of how each content item of the second set of content items is to be selected.

At operation 510, in response to the second request, the client-reception module may receive a second response. The second response may include a third set of content items. In various embodiments, the third set of content items may include the second set of content items minus one or more duplicate content items. The one or more duplicate content items may be items that were included in a set of content items that was previously received for presentation to the user and that satisfied one or more omission criteria (e.g., as described above with respect to FIG. 4).

At operation 512, in response to the second request, the client-reception module 302 may also receive an indication that the third set of content items includes the second set of content items minus the one or more duplicate content items.

At operation 514, based on the receiving of the second response and the receiving of the indication, the user interface module 306 presents the third set of content items to the user. For example, the user interface module displays in a user interface links to a set of listings corresponding to the third set of content items. The user may then select the links to access more information about the listings.

At operation 516, the user interface module 306 provides the user with an option to trigger a sending of a third request. The third request may request the sending of one or more of the one or more duplicate content items that were omitted from the third set of content items that was presented to the user.

Figure 6:
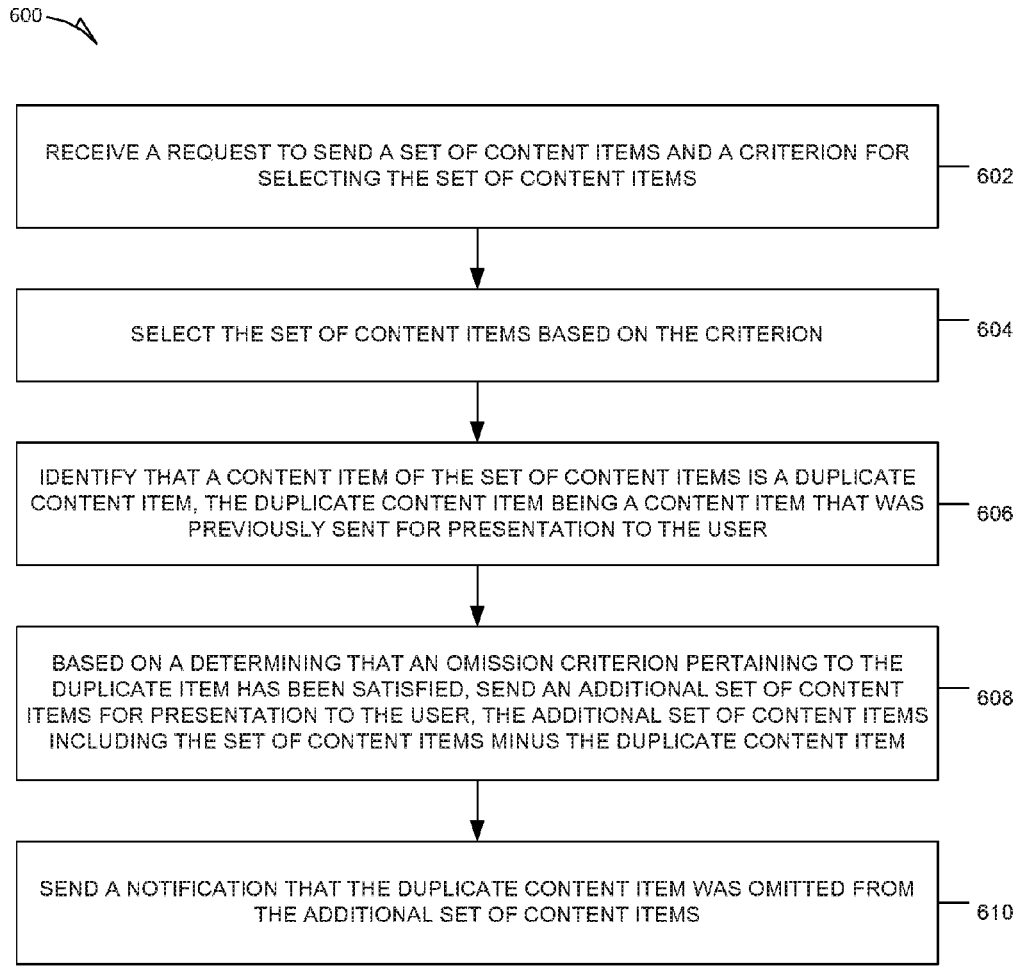
FIG. 6 is a flowchart illustrating example operations of a method of reducing a number of duplications of content items across multiple lists of content items that are presented to a user.

FIG. 6 is a flowchart illustrating example operations of a method 600 of reducing a number of duplications of content items across multiple lists of content items that are presented to a user. In various embodiments, the method 600 may be performed by various modules of the content item list management application(s) 234.

At operation 602, the server-reception module 352 receives a request to send a set of content items (e.g., to the client application(s) 112). In various embodiments, the server-reception module 352 may also receive a criterion for selecting the set of content items that are to be sent.

At operation 604, the selection module 362 selects the set of content items based on the criterion.

At operation 606, the identification module 356 identifies that a content item of the set of content items is a duplicate content item. For example, the identification module identifies that the content item was included in a set of content items that was previously sent for presentation to the user.

At operation 608, based on a determining that an omission criterion pertaining to one or more duplicate items has been satisfied, the server-transmission module 360 sends an additional set of content items for presentation to the user. In various embodiments, the additional set of content items includes the selected set of content items minus the one or more duplicate content items.

At operation 610, based on the determining that the omission criterion was satisfied and based on the sending of the additional set of content items for presentation to the user, the server-transmission module 360 sends a notification that the duplicate content item was omitted from the additional set of content items.

In various embodiments, the server applications 120 may use the functionality of the content item list management application(s) 234 to manage the sending of sets of content items for presentation to the user. For example, each server application, upon determining that a set of content items is to be sent to a user, may send the set of content items to the content list management application(s) 234 to manage the sending of the set of content items. The content list management application(s) may then filter out one or more duplicate content items from the set of content items based on one or more omission criteria. Furthermore, the content list management application(s) may keep track of the one or more duplicate content items that are filtered out such that the content list management application(s) may send them later (e.g., based on a receiving of a request for one or more of the duplicate content items to be sent). Thus, each server application need not keep track of which items are duplicate items (and thus should not be sent to the user) nor keep track of which items were not sent to the user. In this way, the management of the presentation of duplicate items in multiple lists generated by the server application(s) 112 for presentation to the user may be managed centrally.

Figure 7:
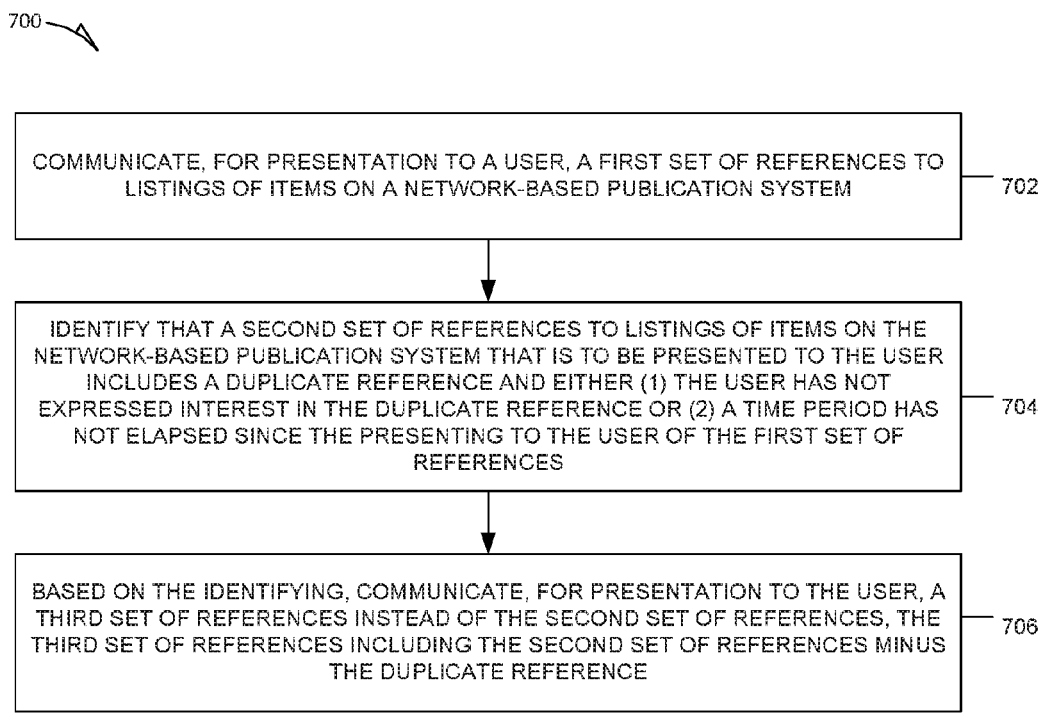
FIG. 7 is a flowchart illustrating example operations of a method of reducing a number of duplications of content items across multiple lists of content items that are presented to a user.

FIG. 7 is a flowchart illustrating example operations of a method 700 of reducing a number of duplications of content items across multiple lists of content items that are presented to a user. In various embodiments, the method 700 may be performed by various modules of the content item list management application(s) 234.

At operation 702, the server-transmission module 360 may communicate, for presentation to a user, a first set of references to listings of items on a network-based publication system.

At operation 704, the identification module 356 may identify that a second set of references to listings of items on the network-based publication system that is to be presented to the user includes one or more duplicate references. Furthermore, the identification module 356 may identify that the user has not expressed interest in one or more of the duplicate references or that a time period has not elapsed since the presenting to the user of the first set of references.

At operation 706, based on the identification of step 704, the server-transmission module 360 may communicate, for presentation to the user, a third set of references instead of the second set of references. Here, the third set of the one or more duplicate references may include the second set of references minus the duplicate reference.

Figure 8:
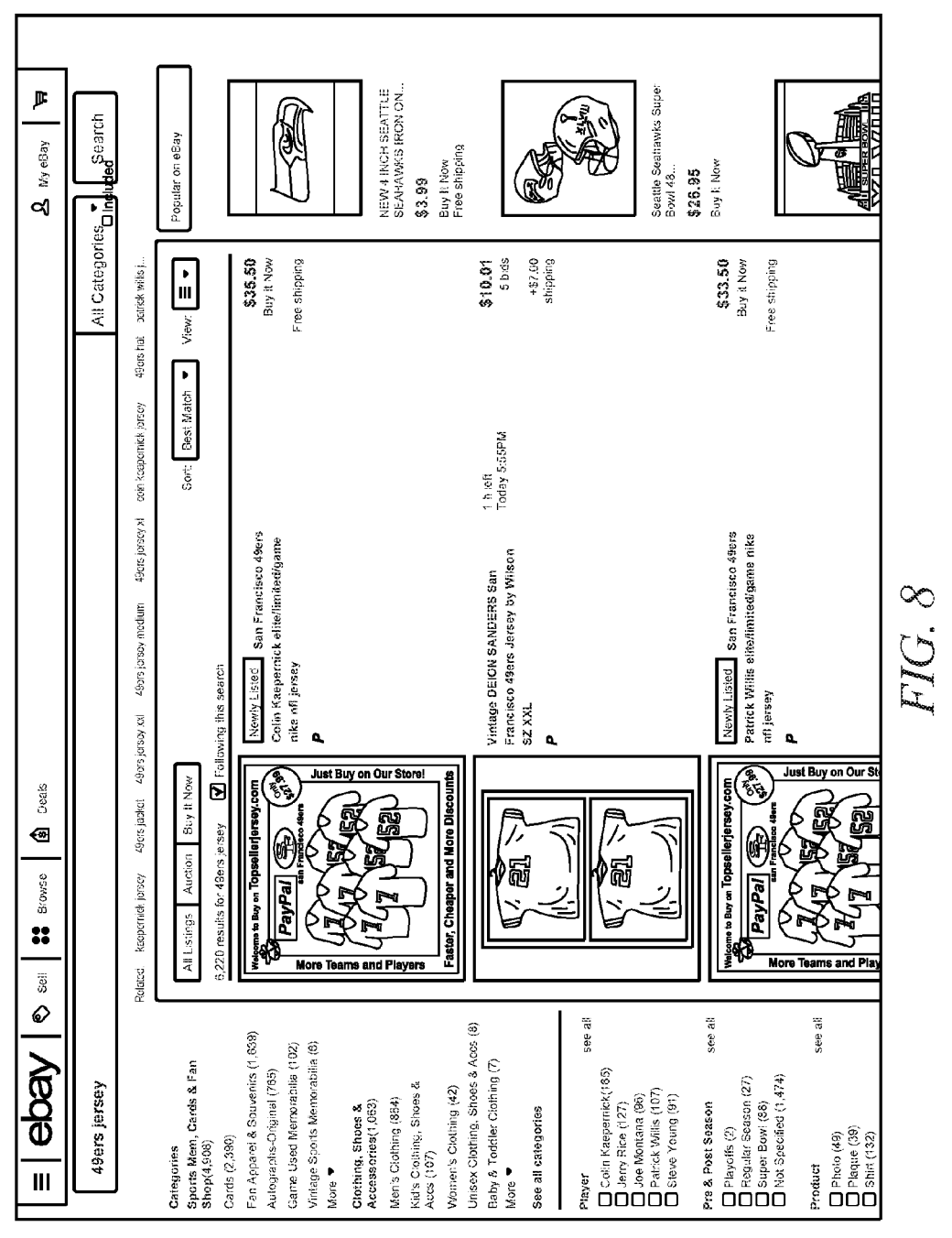

FIG. 8 is a line drawing illustrating an example user interface in which a first list of content items is displayed in a first region of the user interface and a second list of content items is displayed in a second region of the user interface. As shown, the list in the first region of the user interface includes information (e.g., photos, titles, links, and so on) pertaining to items listed on a network-based publication system that match a set of keywords (e.g., "49ers" and "jersey"). In various embodiments, this set of keywords was previously saved by the user to conduct multiple searches over time. In various embodiments, the network-based publication system may allow the user to save such keywords so that the user may find particular items on the network-based publication system even when such items are not kept in stock or do not have a stock-keeping unit number, such as when availability of items on the network-based publication system depends on whether users of the network-based publication system have created listings for them on the network-based publication system (i.e., when users have offered to sell them). Additionally, as shown, the list in the second region includes information pertaining to items included in advertisements that are presented in conjunction with the list in the first region. Here, a content item may have been filtered from the second list based on the content item having been included in the first list and further based on an omission criterion being satisfied (e.g., as described above). Thus, neither of the content lists includes a content item that was included on the other content list.

Figure 9:
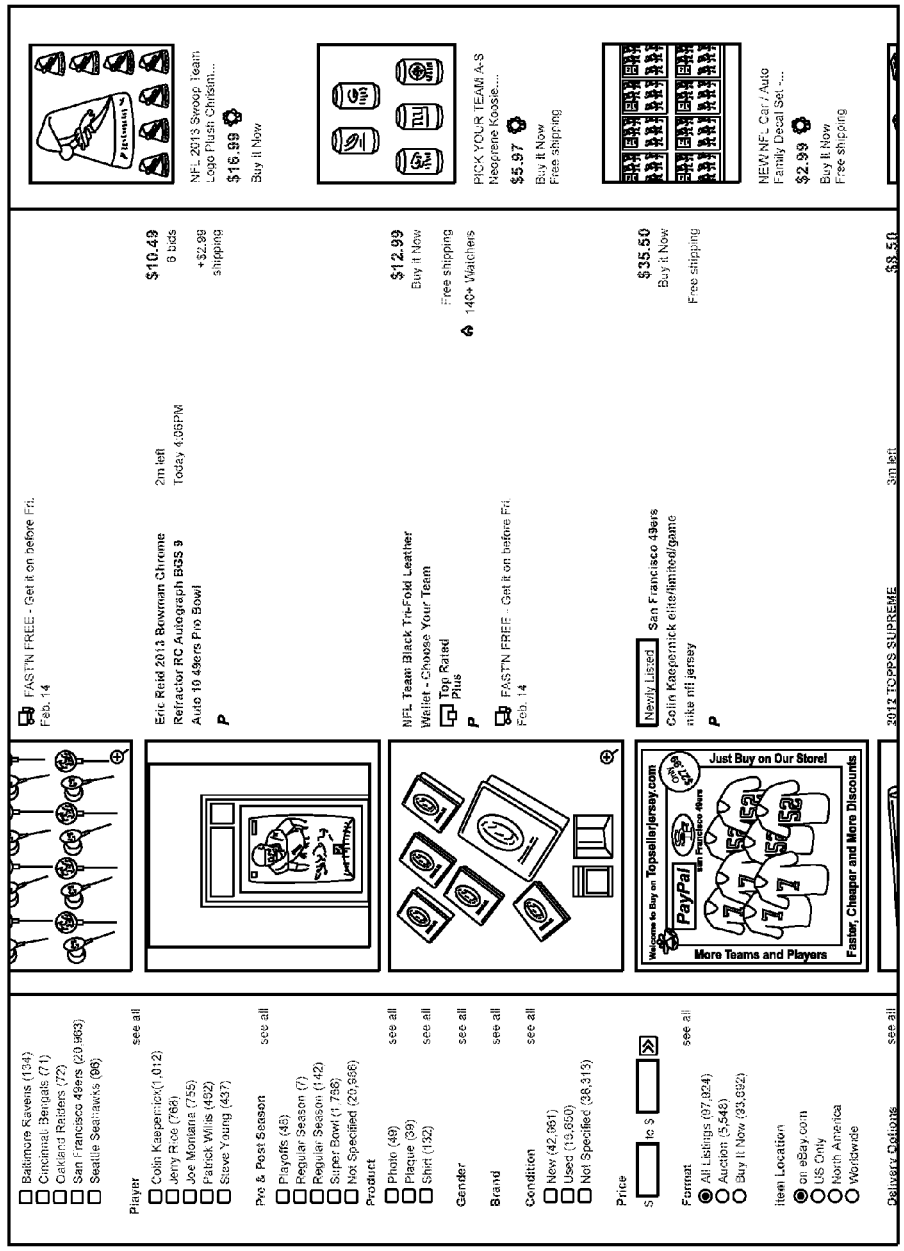
FIG. 9 is a line drawing illustrating an additional example user interface in which a first list of content items is displayed in a first region of the user interface and a second list of content items is displayed in a second region of the user interface.

FIG. 9 is a line drawing illustrating an additional example user interface in which a first list of content items is displayed in a first region of the user interface and a second list of content items is displayed in a second region of the user interface. As shown, the list in the first region of the user interface includes information pertaining to items listed on a network-based publication system that match an additional set of keywords (e.g., "49ers"). Based on a previous list of items having been presented to the user (e.g., the list of items depicted in the first region of the user interface of FIG. 8), the list in the first region of the user interface of FIG. 9 includes information pertaining to an item that was included in the previous list (e.g., a Kaepernick jersey). In various embodiments, this item is presented as a duplicate to the user in this additional list based on an omission criterion not being satisfied (e.g., as discussed above). Additionally, as shown, the list in the second region of the user interface includes information pertaining to items included in advertisements that are presented in conjunction with the list in the first region. In various embodiments, because information pertaining to one of the lists previously shown to the user (e.g., the list of information pertaining items in the first or second user interface regions of FIG. 8 or the list of information pertaining items in the first region of FIG. 9) included information pertaining to an item that was to be presented to the user in the second region of FIG. 9, this duplicate item has been omitted from the presentation (e.g., based on the duplicate item satisfying an omission criterion, as discussed above).

Figure 10:
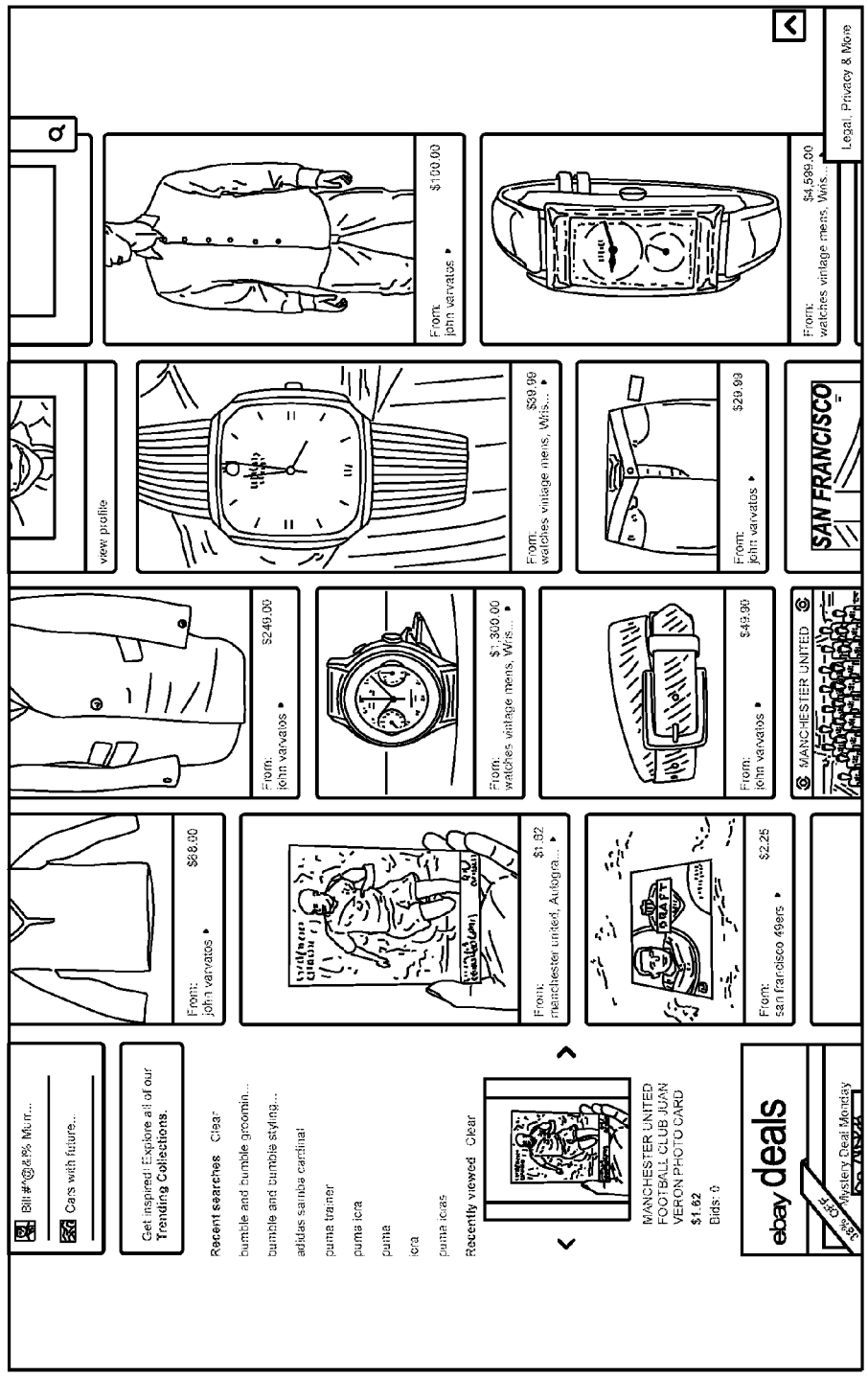
FIG. 10 is a line drawing illustrating an additional example user interface in which a first list of content items is displayed in a first region of the user interface and a second list of content items is displayed in a second region of the user interface.

FIG. 10 is a line drawing illustrating an additional example user interface in which a first list of content items is displayed in a first region of the user interface (e.g., a "Recently Viewed" region or an "Deals" region) and a second list of content items is displayed in a second region of the user interface (e.g., a feed region or a search results region). As shown, the list in the first region of the user interface includes information pertaining to items listed on a network-based publication system that corresponds to information about items that the user has recently viewed or information about items for which that are deals being advertised to the user. Additionally, the list in the second region of the user interface includes information pertaining to items that match keywords entered by the user or that are presented to the user in a feed (e.g., a news feed). As shown, an item presented to the user in the first user interface region (e.g., a Manchester United Football Club Juan Veron Photo Card) also appears in the second user interface region. In various embodiments, this duplication of information about the item in both lists of items may be based on the information not being selected for removal from the list (e.g., based on an omission criterion not being satisfied).

Although not depicted in FIG. 8-10, when information pertaining to an item is removed from one or more lists, the user interface may include an element (e.g., a link, button, etc.) that the user may select to have the omitted item shown in the list from which it was omitted. In various embodiments, the user interface element may be presented to the user based on a notification that the item was omitted from the list. The selection of the item may trigger a communication requesting communication of the information pertaining to the omitted item. Thus, the user may only receive information about filtered items when such information is specifically requested by the user.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 11:
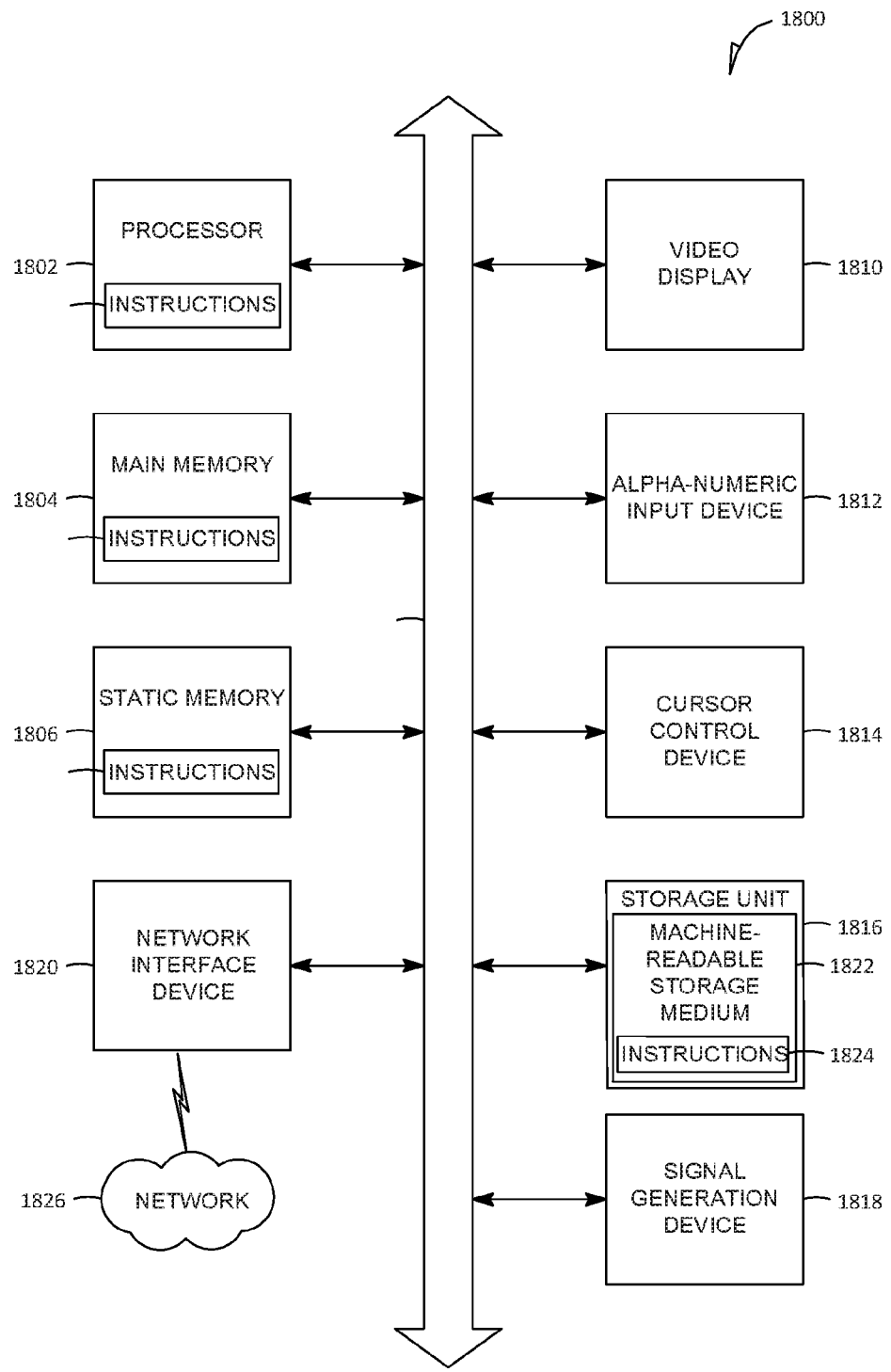
FIG. 11 is a block diagram of machine in the example form of a computer system within which instructions for causing the machine to perform any one or more of the methodologies discussed herein may be executed.

FIG. 11 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
receiving a first set of content items;
detecting that the first set of content items was communicated for presentation to a user in a first list in a first region of a user interface;
receiving a second set of content items;
determining that the second set of content items includes a duplicate content item, the duplicate content item being a content item that was included in the first set of content items; and
based on a satisfaction of an omission criterion, providing an indication that the content item is to be omitted from the second set of content items before the second set of content items is communicated for presentation to the user in a second list in a second region of the user interface;
wherein the user interface is configured to present the second list in the second region of the user interface simultaneously with the presentation of the first list in the first region of the user interface.

2. The method of claim 1, wherein the first set of content items corresponds to a first set of listings of items on a network-based publication system and the second set of content items corresponds to a second set of listings of items on the network-based publication system.

3. The method of claim 2, wherein first set of listings of items corresponds to items that were recommended to the user by the network-based publication system and the second set of listings of items corresponds to items that were generated in response to a request of the user.

4. The method of claim 3, wherein the omission criterion pertains to whether the first list and the second list are to be presented to the user simultaneously in a user interface.

5. The method of claim 1, wherein the omission criterion pertains to a time period between when the first list was presented to the user and when the second list is to be presented to the user.

6. The method of claim 1, wherein the omission criterion pertains to a frequency of an activity of the user with respect to the first list and a frequency of an activity of the user with respect to the second list.

7. The method of claim 6, further comprising, based on a receiving of a request by the user to provide the content item, providing a notification that the content item is to be communicated for presentation to the user in conjunction with the second list.

8. A system comprising:
   at least one processor;
   at least one module implemented by the at least one processor and configured to:
      receive a first set of content items;
      detect that the first set of content items was communicated for presentation to a user in a first list in a first region of a user interface;
      receive a second set of content items;
      determine that the second set of content items includes a duplicate content item, the duplicate content item being a content item that was included in the first set of content items; and
      based on a satisfaction of an omission criterion, provide an indication that the content item is to be omitted from the second set of content items before the second set of content items is communicated for presentation to the user in a second list in a second region of the user interface;
   wherein the user interface is configured to present the second list in the second region of the user interface simultaneously with the presentation of the first list in the first region of the user interface.

9. The system of claim 8, wherein the first set of content items corresponds to a first set of listings of items on a network-based publication system and the second set of content items corresponds to a second set of listings of items on the network-based publication system.

10. The system of claim 9, wherein first set of listings of items corresponds to items that were recommended to the user by the network-based publication system and the second set of listings of items corresponds to items that were generated in response to a request of the user.

11. The system of claim 10, wherein the omission criterion pertains to whether the first list and the second list are to be presented to the user simultaneously in a user interface.

12. The system of claim 8, wherein the omission criterion pertains to a time period between when the first list was presented to the user and when the second list is to be presented to the user.

13. The system of claim 8, wherein the omission criterion pertains to a frequency of an activity of the user with respect to the first list and a frequency of an activity of the user with respect to the second list.

14. The system of claim 13, the operations further comprising, based on a receiving of a request by the user to provide the content item, providing a notification that the content item is to be communicated for presentation to the user in conjunction with the second list.

15. A non-transitory machine readable medium embodying a set of instructions that, when executed by a processor, causes the processor to perform operations comprising:
   receiving a first set of content items;
   detecting that the first set of content items was communicated for presentation to a user in a first list in a first region of a user interface;
   receiving a second set of content items;
   determining that the second set of content items includes a duplicate content item, the duplicate content item being a content item that was included in the first set of content items; and
   based on a satisfaction of an omission criterion, providing an indication that the content item is to be omitted from the second set of content items before the second set of content items is communicated for presentation to the user in a second list in a second region of the user interface;
   wherein the user interface is configured to present the second list in the second region of the user interface simultaneously with the presentation of the first list in the first region of the user interface.

16. The non-transitory machine readable medium of claim 15, wherein the first set of content items corresponds to a first set of listings of items on a network-based publication system and the second set of content items corresponds to a second set of listings of items on the network-based publication system.

17. The non-transitory machine readable medium of claim 16, wherein first set of listings of items corresponds to items that were recommended to the user by the network-based publication system and the second set of listings of items corresponds to items that were generated in response to a request of the user.

18. The non-transitory machine readable medium of claim 17, wherein the omission criterion pertains to whether the first list and the second list are to be presented to the user simultaneously in a user interface.

19. The non-transitory machine readable medium of claim 15, wherein the omission criterion pertains to a time period between when the first list was presented to the user and when the second list is to be presented to the user.

20. The non-transitory machine readable medium of claim 15, wherein the omission criterion pertains to a frequency of an activity of the user with respect to the first list and a frequency of an activity of the user with respect to the second list.

* * * * *